United States Patent [19]

Kah, Jr.

[11] Patent Number: 4,508,136

[45] Date of Patent: Apr. 2, 1985

[54] ANTI-SYPHON FLOW CONTROL VALVE

[76] Inventor: Carl L. C. Kah, Jr., 778 Lakeside Dr., North Palm Beach, Fla. 33408

[21] Appl. No.: 426,375

[22] Filed: Sep. 29, 1982

[51] Int. Cl.³ .................... F16K 24/02; F16K 31/385
[52] U.S. Cl. .................................. 137/218; 137/217; 137/512.4; 251/46
[58] Field of Search ............... 137/218, 512.15, 217, 137/512.4; 251/46

[56] References Cited

U.S. PATENT DOCUMENTS

| 2,270,838 | 1/1942 | Langdon | 137/217 |
| 3,005,616 | 10/1961 | Seele | 137/218 X |
| 3,120,855 | 2/1964 | Fischer | 137/218 |
| 3,376,884 | 4/1968 | Bucknell et al. | 137/512.15 X |
| 3,727,630 | 4/1973 | McInnis | 137/218 |
| 4,125,124 | 11/1978 | Kah | 137/217 X |
| 4,135,696 | 1/1979 | Saarem et al. | 251/46 X |
| 4,180,236 | 12/1979 | Saarem et al. | 251/46 X |

Primary Examiner—Gerald A. Michalsky
Attorney, Agent, or Firm—Jack N. McCarthy

[57] ABSTRACT

A liquid flow control valve having a valve seat and a valve plug for engaging said valve seat, said plug being connected to a pressure responsive device, such as a diaphragm, for movement therewith, said control valve being opened and closed by forces acting on opposite sides of said diaphragm, an anti-syphon valve located below said diaphragm for directing air into said flow control valve when a suction occurs at the inlet to said valve seat; said anti-syphon valve comprising an annular array of flaps which control the flow of air through openings in the body of said liquid flow control valve. Said flaps can be arranged to also provide a barrier to reverse flow from the liquid flow control valve exit through said valve seat to its inlet. Said liquid flow control valve can be of the pilot valve operated type or manually operated.

1 Claim, 10 Drawing Figures

ANTI-SYPHON FLOW CONTROL VALVE

TECHNICAL FIELD

This invention relates to diaphragm actuated flow control valves and more particularly to such valves having an anti-syphon device.

BACKGROUND ART

Flow control valves of the type having a liquid pressure actuated diaphragm to control opening and closing of the valve have long been known in the art. Typically, such valves include a means for bleeding liquid pressure from the inlet side of the valve to a control chamber where the liquid bled from the inlet acts on the diaphragm to maintain the valve closed, a pilot valve being provided to relieve the pressure in the control chamber to effect opening of the valve. However, these valves were not provided with an anti-syphon device such as disclosed herein. Similar control valves are shown in U.S. Pat. No. 3,591,126, U.S. Pat. No. 4,081,171, U.S. Pat. No. 4,105,186, U.S. Pat. No. 4,135,696 and U.S. Pat. No. 4,180,236. These patents in turn refer to other valve assemblies.

DISCLOSURE OF INVENTION

An object of this invention is to provide a diaphragm actuated flow control valve having a pilot valve for controlling its movement wherein said control valve includes an anti-syphon device which admits air into the housing of the control valve when a suction is applied thereto.

Another object of this invention is to provide a diaphragm actuated flow control valve having an anti-syphon valve assembly below said diaphragm cooperating with the valve body.

A further object of this invention is to provide an annular anti-syphon device which includes an annular valve assembly wherein an annular valve means contacts openings through the body to permit air to enter when suction occurs at the valve inlet.

Another object of this invention is to provide a diaphragm support ring for supporting the moving part of the diaphragm with the inner part of the ring guiding a valve plug while an opening is directed from the exterior of the valve body to a point within said diaphragm support ring; an annular resilient member is placed against holes in the bottom of the diaphragm support ring and its action therewith provides the valving action.

A further object of this device is to provide an annular resilient member which moves with the valve plug, said plug holding the annular resilient member against air inlet holes when the valve plug is in its open position.

Another object of this invention is to provide the annular resilient member of the anti-syphon valve assembly with radial cuts to divide it into flaps.

A further object of this device is to provide a supplemental valving member on the bottom of the diaphragm and valve plug assembly to provide for a faster closing movement than would be possible with the entire diaphragm and valve plug assembly.

Another object of the invention is to provide for a manually controlled diaphragm actuated flow valve whereby the valve plug can be placed and held in a closed position, or an opening limit placed on it.

A further object of this invention is to provide a diaphragm actuate flow control valve having a diaphragm with valve flaps extending down integrally around the periphery thereof, said flaps cooperating with air openings in an annular valve seat around the interior of the valve body in one position to close them, said valve members being movable when a suction occurs at the inlet of the valve to place their ends against an inlet conduit to block flow to the inlet from the exit of the valve. This construction of the valve flaps in conjunction with the housing permits the enlarging of the valve air openings without increasing the diameter of the housing.

BEST MODE FOR CARRYING OUT THE INVENTION

Figure 1:
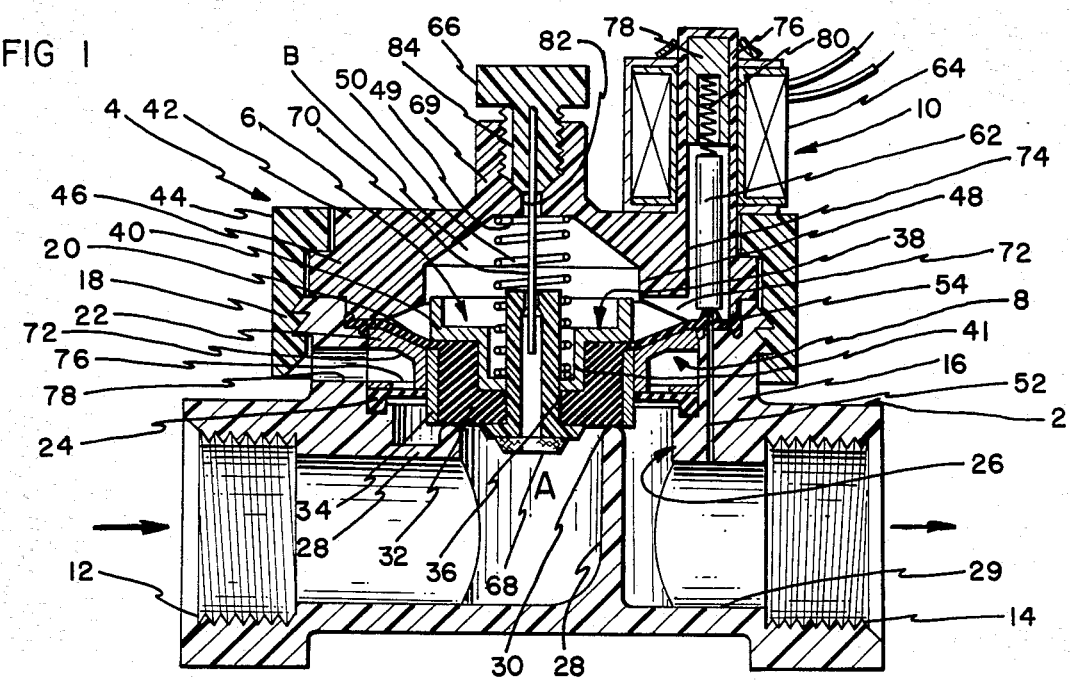
FIG. 1 is a sectional side view showing a diaphragm actuated control valve having an anti-syphon device.

The flow control valve shown in FIG. 1 includes five main parts: (1) a valve body 2; (2) cover means 4; (3) a diaphragm and valve plug assembly 6 for positioning between said valve body 2 and cover means 4; (4) a diaphragm support ring and anti-syphon valve assembly 8; and (5) a solenoid operated pilot valve 10.

The valve body 2 comprises a member having an inlet 12 and an outlet 14, at a point intermediate the inlet and outlet an annular projection 16 extends therefrom; this annular projection 16 has external threads 18 at its outer side for a purpose to be hereinafter described. The inner surface of the annular projection 16 is formed having a first countersunk portion for receiving the outer edge of the diaphragm 20 of the diaphragm and valve plug assembly 6. A second countersunk portion extends further down into said annular projection 16 and receives a diaphragm support ring 22 and anti-syphon valve member 24, of diaphragm support ring and anti-syphon valve assembly 8.

The anti-syphon valve member 24 is annular and formed of a resilient material (such as rubber or a plastic) having an O-ring formed at the outer periphery thereof; an annular groove is formed in the outer edge of the bottom of the second countersunk portion to receive the O-ring. The anti-syphon valve member 24 and diaphragm support ring 22 are sized so that the upper edge of the diaphragm support ring meets with the bottom of the first countersunk portion. The top of the diaphragm support ring 22 has an annular face tapering downwardly as it extends inwardly to support the diaphragm 20 when it is positioned downwardly while the bottom is formed as a flat annular surface. The inwardly extending portion of the valve member 24 from the O-ring is flat and positioned against the flat bottom annular surface of the diaphragm support ring 22. A cylindrical surface is provided at the center of the diaphragm support ring 22 for a purpose to be hereinafter described.

A peripheral groove 72 extends radially inwardly into diaphragm support ring 22 between the upper tapering diaphragm support face and flat bottom annular surface. A plurality of holes 78 are located around the annular projection 16 to permit air to enter the groove 72, and a plurality of holes 76 are located in the bottom of the diaphragm support ring 22 to connect the groove 72 to the flat bottom annular surface which is contacted by the flat inwardly extending portion of anti-syphon valve member 24 closing the holes 76. The flat inwardly extending portion of anti-syphon valve member 24 is radially cut from its inner edge to the O-ring between each pair of holes 76 to provide an individual valve flap for each hole 76, for a purpose to be hereinafter described.

A third countersunk portion extends down further into the valve body 2 and forms a lower chamber 26 into which a conduit 28 extends from inlet 12 and turns upwardly to form an annular valve seat 30. Lower chamber 26 is connected to outlet 14 by an outlet conduit 29. The diaphragm 20 has an integral valve plug 32 extending downwardly at the center thereof which provides a valving action with the valve seat 30, to be hereinafter described. The outer edge of the diaphragm 20 is formed having an upwardly extending first peripheral bead therearound which is positioned against the side of the first countersunk portion and a downwardly extending second annular bead spaced inwardly which is positioned in a groove between the meeting surfaces of the diaphragm support ring 22 and annular projection 16 where the first countersunk portion ends.

The integral valve plug 32 has a cylindrical member 34 fixed around the outer surface thereof such as by a press fit. This member 34 is permitted a sliding motion within the cylindrical surface at the center of diaphragm support ring 22. A cylindrical member 36 extends upwardly through the center of the integral valve plug 32 with an outwardly extending lower annular flange engaging the center part of the integral valve plug 32. The upper part of the integral valve plug 32 has a central countersunk portion and a support member 38 comprising a flat annular portion 40 is pressed against the upper portion of integral valve plug 32 and has a downwardly extending cylindrical portion 41 extending from its inner edge which fits into the central countersunk portion in the top of the integral valve plug 32. The lower edge of this cylindrical portion 41 extends inwardly at the bottom of the central countersunk portion to engage the cylindrical member 36 as a press fit forming a spring seat, to be hereinafter described. The flat annular portion 40 has an upwardly extending cylindrical flange extending from its outer edge which acts as a guide member, to be hereinafter described.

The cover means 4 includes a cover 42 which is positioned on the upper edge of annular projection 16 and the outer end of diaphragm 20. This cover 42 is fixed in place by a lock ring 44 which has an inwardly extending annular flange contacting the top of an outwardly extending flange 46 on the cover 42. The lock ring 44 has internal threads to engage the external threads 18 of the annular projection 16. This fixes the cover 42 in place with respect to the valve body 2.

The bottom of the outwardly extending flange 46 engages the top of annular projection 16 and a flat annular portion of the cover 42 extends into the first countersunk portion and abuts the outer periphery of diaphragm 20 with the outer edge of the flat annular portion of the cover 42 providing an annular groove for containing the upwardly extending first peripheral bead. An inwardly extending annular face tapers upwardly from said flat annular portion of the cover 42 in alignment with the annular face of the diaphragm support ring 22 to support the diaphragm 20 when it is positioned upwardly. A cylindrical bore 48 extends upwardly in cover 42 from the inner end of the tapered inwardly extending annular face. The top of the cylindrical bore then tapers inwardly and upwardly to a flat top 49 which acts as the upper spring seat for the top of a spring 50; the bottom of the spring 50 extends around the cylindrical member 36 into the lower spring seat formed in support member 38. It can be seen that this spring 50 acts to move the valve plug 32 into a closed position with annular valve seat 30. The cylindrical flange extending upwardly from the outer edge of flat annular portion 40 projects into and is guided in the cylindrical bore 48.

The interior A of conduit 28 is connected to the chamber B, formed between the inner side of cover 42 and the upper side of the diaphragm and valve plug assembly 6, through the cylindrical member 36 to permit the pressure of a liquid in the conduit 28 to be transmitted to the chamber B to act downwardly against the diaphragm and valve plug assembly 6 to keep the valve plug 32 against the seat 30 in a closed position.

The interior of chamber B is connected to conduit 29 by a passageway 52 in valve body 2, an aligned passageway 54 in diaphragm 20, and a passageway 72 to control the pressure in chamber B. The cross-sectional area of the passageways 52, 54, and 72 must be greater than that provided through cylindrical member 36. The diaphragm 20 has a radial extending portion 56 which fits in a mating notch in the first countersunk portion of valve body 2. It is at this point that the aligned passageways 52 and 54 pass through. An integral valve seat 60 extends upwardly around passageway 54 for a purpose to be hereinafter described. A short bead section 58 extends around the bottom of the radial extending portion 56 and is connected at both ends to the downwardly extending second annular bead. This short bead section 58 has a mating groove in the bottom of the first countersunk portion to seal the flow through the passageways 52 and 54.

A solenoid operated pilot valve 10 is associated with the cover 42. A cylindrical opening 74 is formed in cover 42 extending from passageway 54 in integral valve seat 60 and intersecting passageway 72. The top of the opening 74 extends into a projection 76 extending from the top of the cover 42. A core 78 is fixed in the closed top of cylindrical opening 74 and a movable armature plunger 62 is positioned between the bottom of core 78 and the valve seat 60 and extends into the projection 76. A spring 80 is positioned in a recess in the bottom of core 78 and extends therefrom to bias plunger 62 against valve seat 60 to close passageway 54 and thereby permit a buildup of pressure in chamber B equal to that in conduit 28. A solenoid 64 is fixed on the projection 76 to control the movement of the armature plunger 62. When the solenoid 64 is energized, the armature plunger 62 is pulled up against the core 78 thereby opening passageway 54, permitting the pressure in chamber B to drop by being opened to conduit 29.

While use of the solenoid operated pilot valve 10 provides an easy way to electrically control the pressure in chamber B, a manual valve 66 is provided to open the chamber B to atmosphere, if necessary. Valve 66 is located in a projection 69 on cover 42 which is aligned with cylindrical member 36. To keep the flow control valve free of dirt contamination, a screen 68 is provided at the bottom of the cylindrical member 36 and a thin rod 70 extends into the top of the cylindrical member 36 from the valve 66. The top of the cylindrical member 36 is sized around the thin rod 70 to control the amount of flow through cylindrical member 36 to obtain the desired valve movement.

The flow control valve shown in FIG. 1 operates as follows:

A source of liquid under pressure is directed into inlet 12 and this liquid is stopped by the control valve at the valve plug 32 which is seated on valve seat 30. This liquid is bled to chamber B above diaphragm and valve plug assembly 6. Since the area acted on above the diaphragm and valve plug assembly 6 is greater than the area of the valve plug 32 presented to the valve seat 30, the flow control valve remains closed. A spring 50 aids in the closing action to obtain a desired valve movement. When chamber B is connected to outlet 14 by pilot valve 10, the pressure in the chamber B is reduced to a value which will not provide a force great enough to act with spring 50 and maintain the valve plug 32 on valve seat 30, therefore the pressure acting on the bottom of the valve plug 32 opens the flow control valve, placing the diaphragm 20 against the tapered annular face of the cover 42. Liquid then flows through the flow control valve.

The flow control valve can also be opened by connecting chamber B to atmosphere which also reduces the pressure therein. This is done by turning manual valve 66 to open it and connect the groove 84 down the side of the threads with a hole 82 in the top of the cover 42.

When liquid is flowing through the flow control valve, if a condition occurs which places a suction on the inlet 12, to protect the liquid supply from contamination by reverse flow, the valve flaps of anti-syphon valve member 24 are sucked downwardly allowing air to be drawn through the valve seat 30 and permitting the diaphragm and valve plug assembly 6 to be moved immediately downwardly to its closed position.

Figure 2:
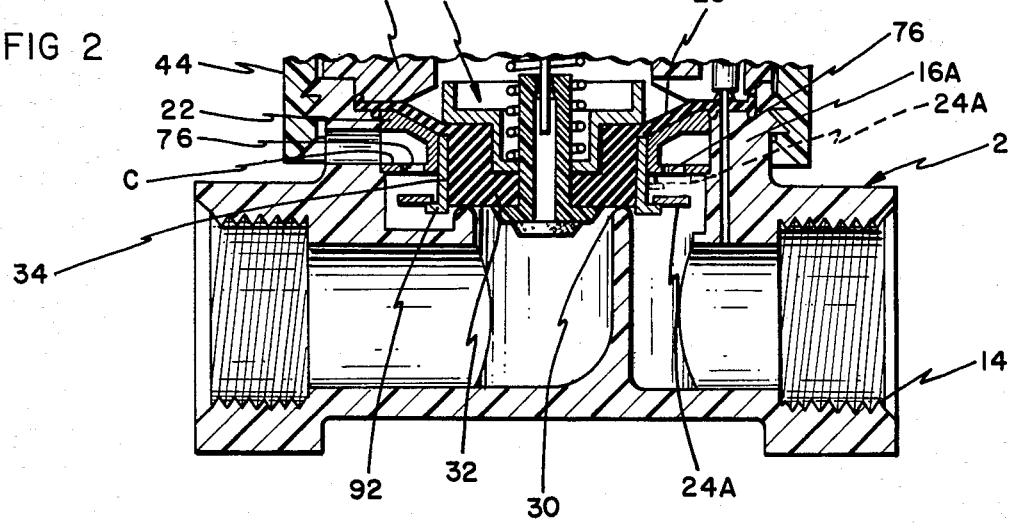
FIG. 2 is a view similar to FIG. 1 showing a modification of the anti-syphon valve means in the control valve.

The modification of the flow control valve in FIG. 2 provides a change in the anti-syphon valve means. The anti-syphon valve member 24, shown in FIG. 1, is left out and the second countersunk portion is formed to a depth in the annular projection 16A so that the diaphragm support ring 22 is supported on the annular shelf C formed between the second countersunk portion and the third countersunk portion. An O-ring for sealing can be placed at this location if necessary. The third countersunk portion is made of a larger diameter so that an anti-syphon valve washer 24A, formed of a resilient material, can be placed under the ring of holes 78. The valve washer 24A is supported at its inner edge by an outwardly extending flange 92 on the cylindrical member 34. It can be seen that as the diaphragm and valve plug assembly 6 moves to its open position that the valve washer 24A is placed in a position against the flat bottom annular surface of the diaphragm support ring 22; this closes the holes 76 (see showing in phantom on right side of FIG. 2).

The valve washer 24A is radially cut from its outer edge to a point adjacent its inner edge between each pair of holes 76 to provide an individual valve flap for each hole 76. As in FIG. 1, a suction on inlet 12 sucks the valve flaps of anti-syphon valve washer 24A downwardly allowing air to be drawn through the valve seat 30 and permitting the diaphragm and valve plug assembly 6 to be moved immediately downwardly to its closed position.

Figure 4:
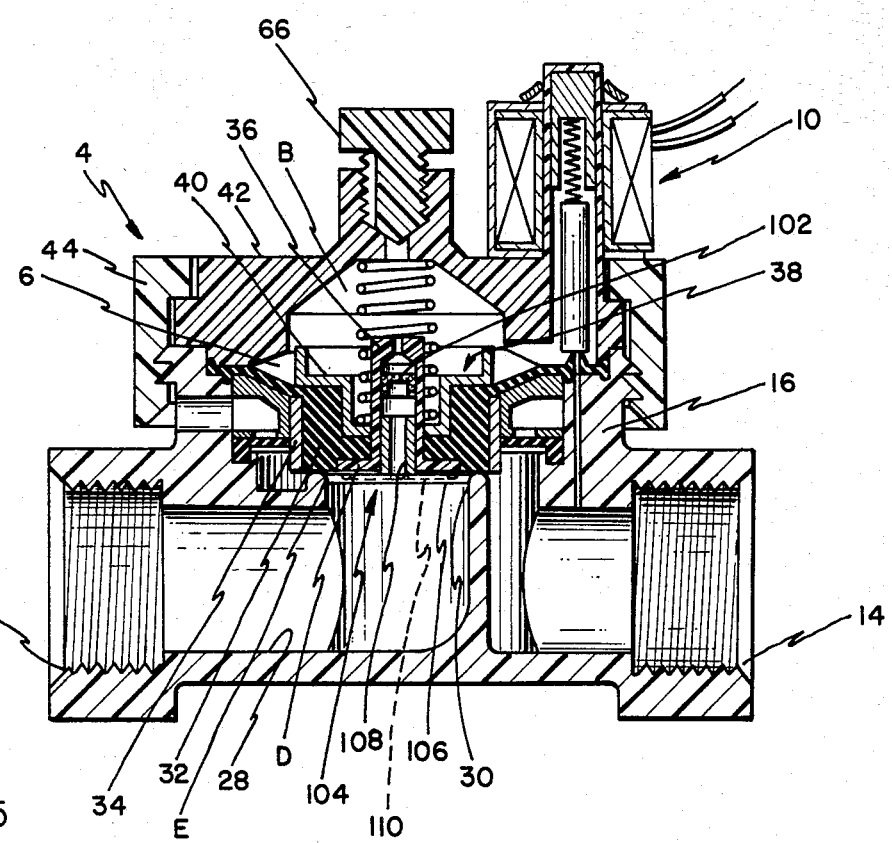
FIG. 4 is a view similar to FIG. 1 showing a modification of the diaphragm and valve plug assembly of the control valve to aid its closing action when a suction occurs in the valve inlet.
Figure 5:
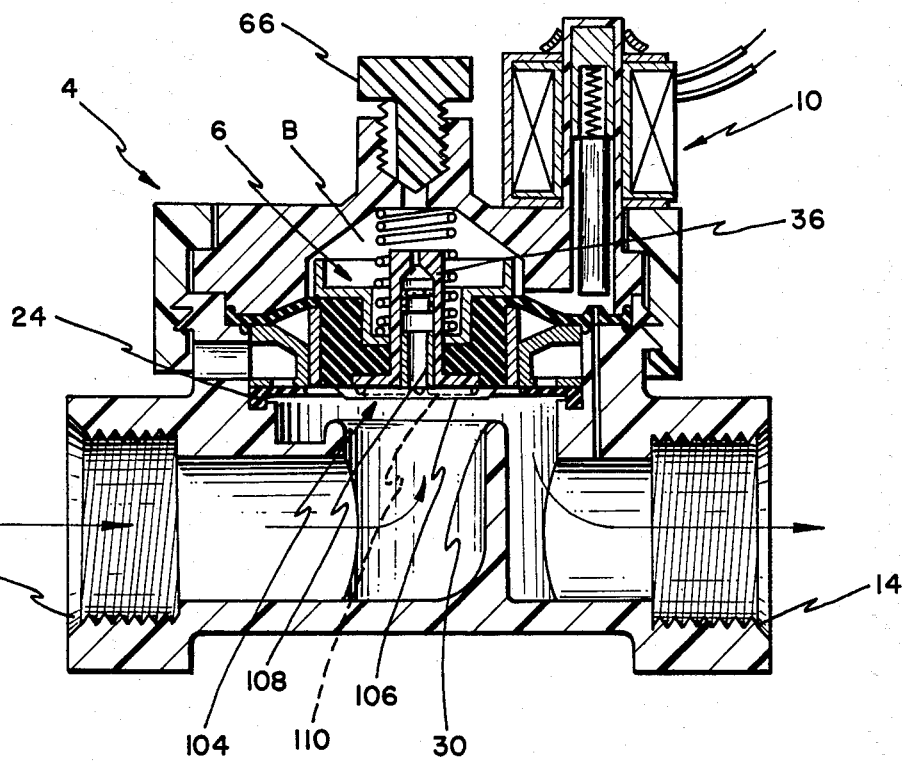
FIG. 5 is a view similar to FIG. 4 showing the control valve open.
Figure 6:
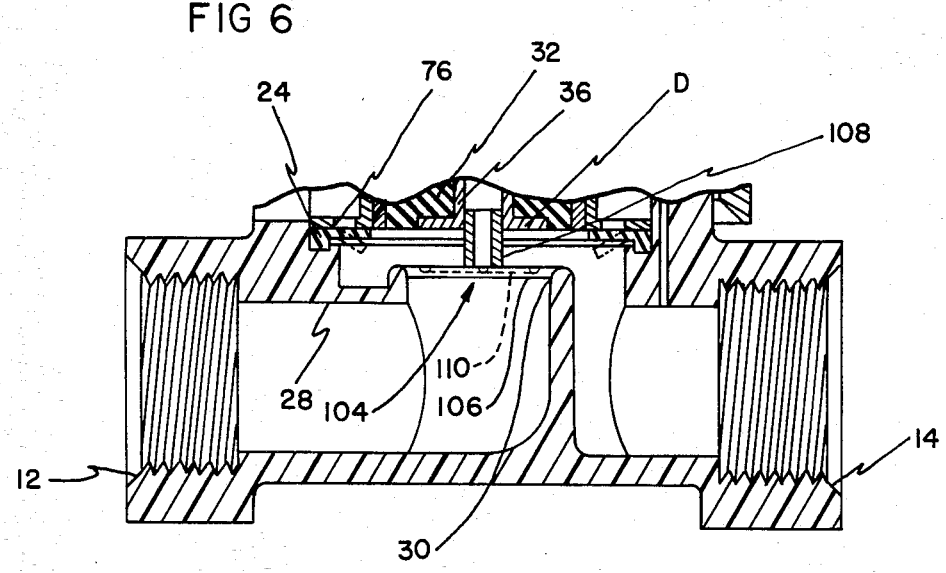
FIG. 6 is a view similar to FIG. 5 showing the main components of the valve in their open position while the valve seat has been moved to a closed position by suction from the inlet.

The modification of the flow control valve in FIGS. 4, 5, and 6 provides a change in the diaphragm and valve plug assembly 6. In this modification the integral valve plug 32 has an annular groove 100 in the center part of the bottom of the integral valve plug 32 to receive the outwardly extending lower annular flange D of cylindrical member 36. This makes the bottom of the flange D even with the bottom of the integral valve plug 32. The upper part of the integral valve plug 32 has a support member 38 as shown in FIG. 1. The screen 68 shown in FIG. 1, is left out and a screen 102 is placed in the upper part of cylindrical member 36. A supplemental valving member 104 is located on the bottom of the diaphragm and valve plug assembly 6.

This valving member 104 is formed as a circular plate 106 having a short cylindrical guide member 108 extending upwardly from the center thereof. The short cylindrical guide member 108 extends into the cylindrical member 36 for slideable movement therein; this permits separate movement of supplemental valving member 104 with respect to integral valve plug 32. The top of the circular plate 106 has a plurality of radial grooves 110 which are open at their outer ends at the periphery of the circular plate 106 and which communicate with the interior of the short cylindrical guide member 108 at their inner ends.

The outer periphery of the circular plate 106 is contoured to fit and seal within the valve seat 30, and when the valve plug 32 is against the seat 30 in a closed position (see FIG. 4), a small space E is provided between the top of the circular plate 106 and the bottom of the integral valve plug 32. The supplemental valving member 104 can seal with no pressure, or with suction, at inlet 12. The small space E permits the supplemental valving member 104 to unseat and move upwardly aginst the bottom of the integral valve plug 32, thereby opening the outer ends of the radial grooves 108, when pressure is applied at inlet 12, permitting the pressure to be transmitted through the radial grooves 110, cylindrical guide member 108, cylindrical member 36, and screen 102, to the chamber B to act downwardly against the diaphragm and valve plug assembly 6 to keep the valve plug 32 against the seat 30 in a closed position.

When the pressure in the interior of chamber B is reduced, such as by the pilot valve 10, to open the flow control valve, the diaphragm and valve plug assembly 6 will move to the position shown in FIG. 5, just as it would move in the modifications of FIGS. 1 and 2. Liquid now flows from inlet 12 to outlet 14, through the flow control valve.

When liquid is flowing through the modification of the flow control valve in FIGS. 4, 5 and 6, if a condition occurs which places a suction on the inlet 12, to protect the liquid supply from contamination by reverse flow, the valve flaps of anti-syphon valve member 24 are sucked downwardly (as shown in phantom in FIG. 6), allowing air to be drawn through the valve seat 30 and at the same time the valving member 104 is immediately pulled into sealing engagement with the valve seat 30. The remainder of the diaphragm and valve plug assembly 6 then moves to its closed position. The valving member 104, in view of its independent movement with respect to integral valve plug 32, allows it to move faster than the entire diaphragm and valve plug assembly 6.

Figure 7:
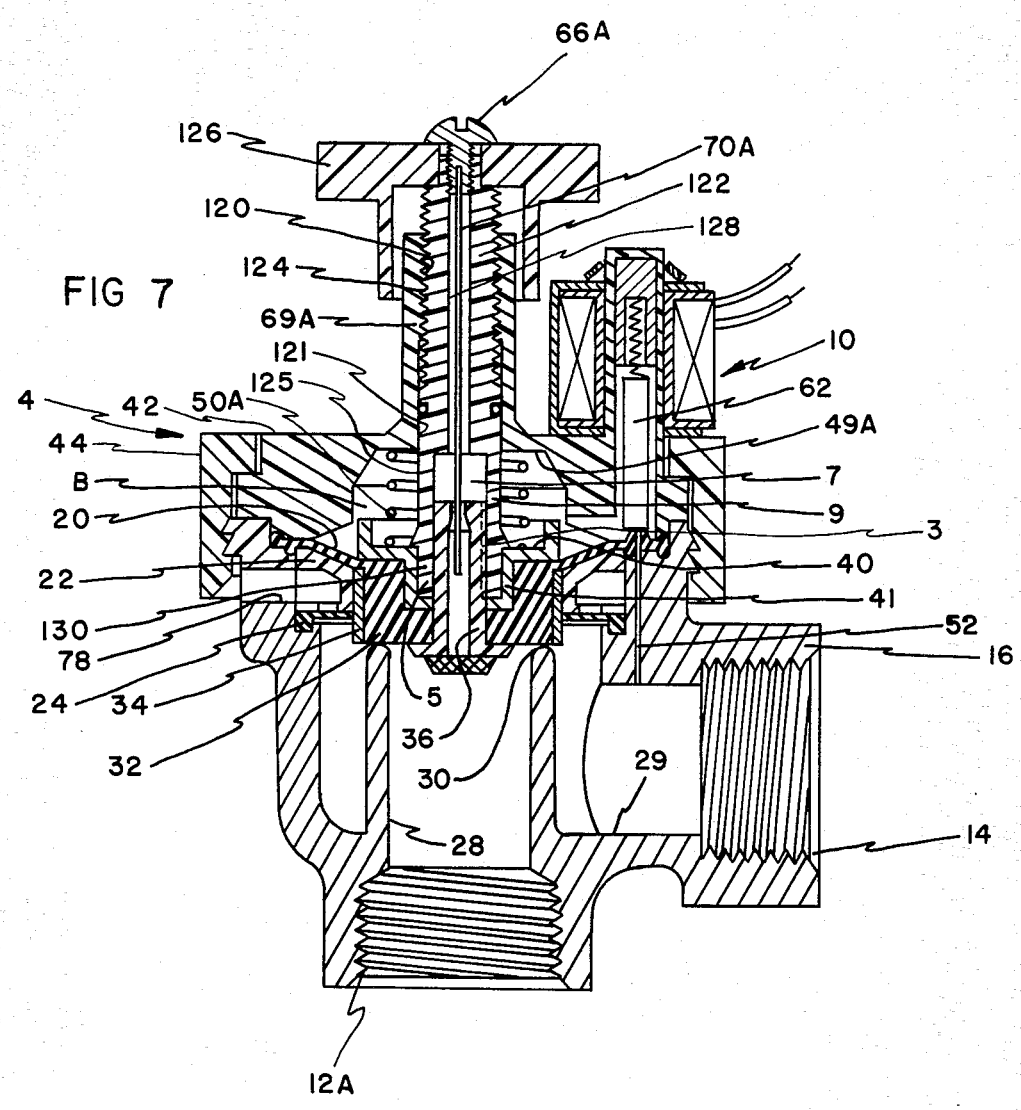
FIG. 7 is a view similar to FIG. 1 which has been modified to provide a 90° turn in the passageway between the inlet and outlet and a manual control for fixing the distance the valve will automatically open including closing the valve, and providing for a manual anti-syphon valve.

The modification of the flow control valve in FIG. 7 provides for a manually controlled diaphragm-actuated flow control valve with an anti-syphon valve means. The inlet 12A also is positioned at a 90° angle with the outlet 14. The cover 42 has an elongated projection 69A with an opening therethrough from the top into chamber B, said opening having threads 120 for approximately one-half of its length and extending with an inner cylindrical surface 121 to chamber B. A valve stem 122 is mounted in said opening with its upper portion threaded at 124 to engage threads 120, and its lower portion formed with an outer cylindrical surface 125 for sliding within cylindrical surface 121. The threaded end of valve stem 122 extends out of the top of projection 69A and the outer cylindrical surface 125 extends down through the cover 42 into chamber B.

A manual knob 126 is fixed to the top of the threaded end of valve stem 122 so that as the knob 126 is turned, the valve stem also turns. Many known fixing means can be used, such as a press fit over a reduced end as shown. The small screw valve 66A could hold the knob on the stem. The small valve 66A works in the same manner as valve 66 of FIG. 1, and includes an elongated thin rod 70A for cleaning. The flat top 49A is formed to extend over flat annular portion 40 of support member 38, a spring 50A extends between the flat top 49A and flat annular portion 40 to act to move the valve plug 32 into a closed position.

Valve stem 122 also has an opening 128 therethrough from its top to bottom. The bottom portion of the valve stem opening 128 extends upwardly from the bottom and is sized to form with the cylindrical surface 125 a cylinder which has a loose slideable fit into the annular recess 5 formed between cylindrical member 36 and cylindrical portion 41, permitting axial flow therealong. A longitudinal groove 3 (shown as dotted) extends along the outside of cylindrical member 36 and directly connects the bottom of annular recess 5 with the space 7 in the valve stem opening 128 above the top of cylindrical member 36. Space 7 is connected to chamber B by radial openings 9 to permit the pressure of the liquid entering inlet 12A to be transmitted to chamber B through cylindrical member 36 for regular valve operation. An outwardly extending peripheral flange 130 extends from the outer cylindrical surface 125.

Movement of knob 126 turns valve stem 122 and moves it between its lowest position where peripheral flange 130 is seated against the inner edge of annular portion 40, placing valve plug 32 against valve seat 30 (valve seat 30 being located on conduit 28 which extends straight upwardly as a pipe from inlet 12A) and therefore fixing the control valve in a closed position; and its uppermost position where it is drawn to the top of chamber B and the control valve can operate as the valve in FIG. 1. At an intermediate position the peripheral flange will limit the upward movement of the valve plug 32, controlling the amount of flow.

If a condition occurs which places a suction on the inlet 12, the valve flaps of anti-syphon valve member 24 are sucked downwardly in the same manner as in FIG. 1.

For the modification of the flow control valve in FIG. 7 to operate as a manual valve, the armature plunger 62 and the spring 50A are removed; it can be seen that as the manual knob is turned in one direction, the valve plug 32 moves downwardly to engage annular valve seat 30 and when it is moved in the opposite direction, the valve plug 32 will be allowed to move upwardly by the pressure of the liquid entering inlet 12A.

Figure 8:
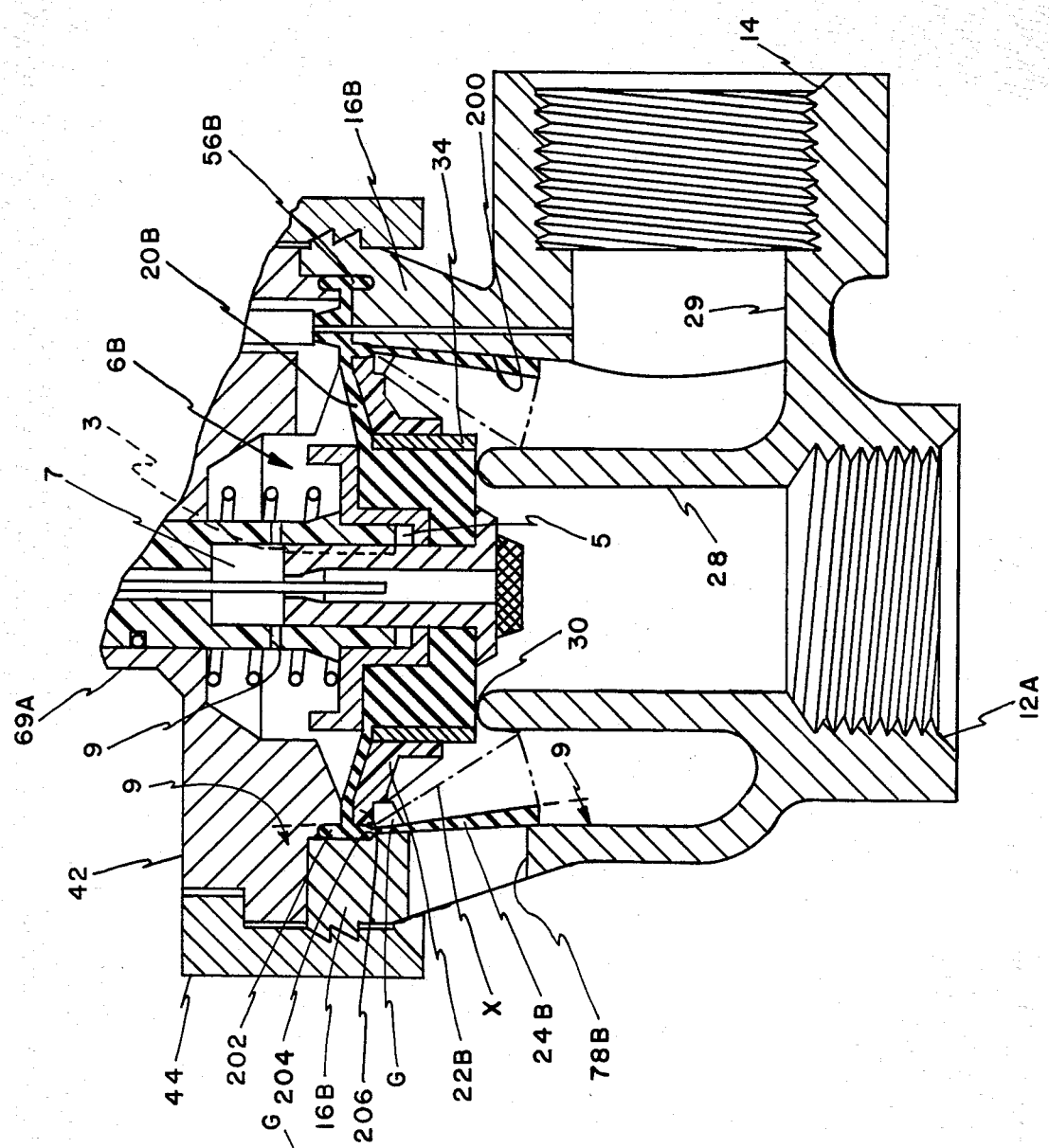
FIG. 8 is a fragmentary view of a modification of the control valve as incorporated in FIG. 7 showing a different anti-syphon valve means.
Figure 9:
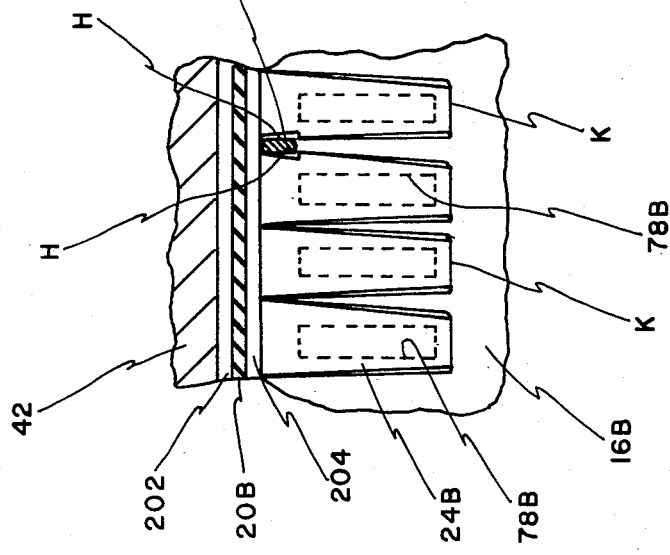
FIG. 9 is a view taken on the line 9—9 of FIG. 8 showing four of the flaps laid flat and showing a projection in cross-section for supporting the diaphragm support ring.

The modification of the flow control valve in FIGS. 8 and 9 includes a change in the anti-syphon valve means and mating portion of the valve body 2. The modification is shown made to FIG. 7. The inner surface of the annular projection 16B is formed having a countersunk portion for receiving the outer edge of the diaphragm 20B and a plurality of spaced projections G extend radially inwardly from the annular projection 16B at the bottom of the countersunk portion to support a diaphragm support ring 22B. The inner surface of the annular projection 16B tapers inwardly below the countersunk portion to act as a valve seat 200, for openings 78B therethrough, to be hereinafter described.

Figure 3:
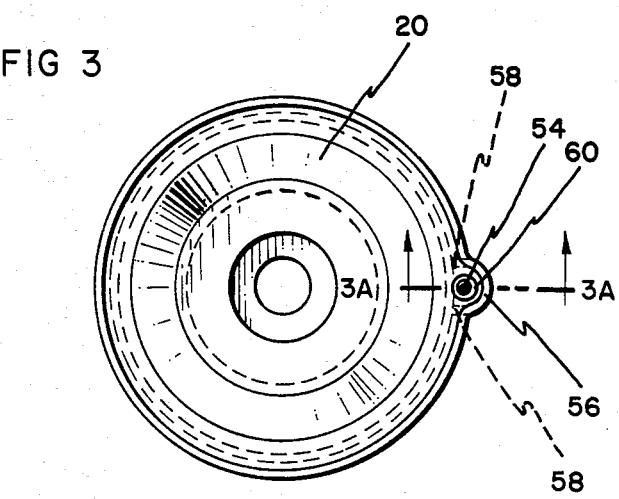
FIG. 3 is a view taken of the top of the diaphragm member shown in FIGS. 1 and 2.
Figure 3A:
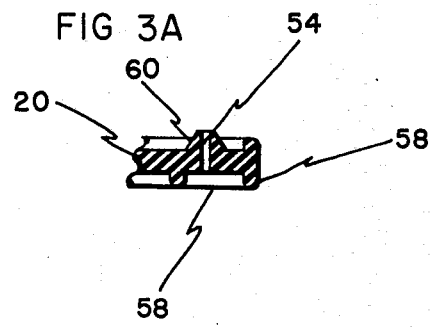
FIG. 3A is an enlarged view taken on the line 3A—3A of FIG. 3.

The outer edge of the diaphragm 20B is formed having an upwardly extending first peripheral bead 202 therearound and an axially aligned downwardly extending second peripheral bead 204. Provision is made for the radial extending porition 56B as in the other modifications (see FIGS. 3 and 3A). A plurality of downwardly extending flaps 24B are formed integrally with said second peripheral bead for a hinging action around its entire periphery to coact with valve seat 200. The first peripheral bead 202 is positioned against the side of the countersunk portion and the second peripheral bead 204 is positioned against the side of the countersunk portion. The bottom of the second peripheral bead 204, outwardly of the connection of the flaps 24B, rests on the bottom of the countersunk portion while the flaps 24B extend downwardly against the valve seat 200.

The diaphragm support ring 22B is an annular member formed having an outer radially extending flange 206 which rests on the projections G while a downwardly projecting cylindrical face centers the diaphragm support ring 22B on the ends of the projections G. The top of the diaphragm support ring 22B has an annular face tapering downwardly as it extends inwardly to support the diaphragm 20B when it is positioned downwardly (as shown). A cylindrical surface is provided at the center of the diaphragm support ring 22B to permit the cylindrical member 34 to have a sliding motion therein.

The centering of the diaphragm support ring 22B on the ends of the projections G properly positions the cylindrical surface at the center of the diaphragm support ring 22B, provides an annular space with the countersunk portion of the annular projection 16B for receiving the second peripheral bead 204, and spaces the bottom edge of the annular flange 206 from the bottom of the countersunk portion to provide for the extending of the flaps 24B therethrough. Each projection G extends between two adjacent flaps 24B, and each flap is cut out at H to allow for the projection. These cutouts H are sized so that when the flaps are in a position shown by the phantom lines X, the cutouts are engaging the sides of the projections G.

The outer edge of the flat annular portion of the cover 42 provides an annular groove for containing the first peripheral bead 202 with the countersunk portion, while the remainder of the flat annular portion holds the diaphragm B and diaphragm support ring 22B in place against the spaced projections G.

When liquid is flowing through the control valve if a condition occurs which places a suction on the inlet 12A, to protect the liquid supply from contamination by reverse flow, the valve flaps 24B are sucked inwardly allowing air to be drawn through the valve seat 30 and permitting the diaphragm and valve plug assembly 6B to be moved downwardly to its closed position. The valve flaps 24B are sucked inwardly until their free ends K sealably engage the outer side of the pipe extending upwardly as conduit 28. This position of the valve flaps 24B, placing them in the position shown by the phantom lines X, provides a barrier to the flow of liquid from the outlet 14 to the inlet 12A. With the ends K of flaps 24B against the upwardly extending pipe, the sides of adjacent valve flaps are also engaging, forming a sealing action.

I claim:

1. A flow control valve having a housing including an inlet and an outlet, a liquid valve means between the inlet and the outlet, said liquid valve means comprising a valve seat and a valve plug means for engaging said valve seat, a pressure responsive diaphragm mounted in said housing above said plug means, said plug means being connected to said pressure responsive diaphragm for movement therewith, said plug means being moved between an open and closed position by forces acting on opposite sides of said pressure responsive diaphragm, a first chamber being formed above said pressure responsive diaphragm with said housing, a second chamber being formed below said pressure responsive diaphragm with said housing, a diaphragm support ring being positioned in said second chamber to support said diaphragm when said liquid valve means has its valve plug means in its closed position, said valve seat opening into said second chamber, a first conduit means connecting said valve seat to said inlet, a second conduit means connecting said second chamber to said outlet, opening means connecting the exterior of said housing to said second chamber, anti-syphon valve means cooperating with said opening means to connect the exterior of said housing to said second chamber and valve seat when a suction occurs in said inlet, said anti-syphon valve means having valve flap means extending downwardly into said second chamber, said flap means cooperating with said opening means in said housing to normally close said opening means, said flap means being pulled inwardly into said second chamber when a suction occurs, said flap means contacting the first conduit means in their innermost position to block a reverse flow from the outlet to the inlet, said diaphragm support ring being position on projections extending inwardly from said housing, each projection extending between a pair of adjacent flaps, said flaps having notches to receive said projections, said flap notches engaging the sides of said cooperating projections when said flaps have been pulled inwardly.

* * * * *